(12) United States Patent
Tanaka et al.

(10) Patent No.: US 8,527,531 B2
(45) Date of Patent: Sep. 3, 2013

(54) STREAM DATA GENERATING METHOD, STREAM DATA GENERATING DEVICE AND A RECORDING MEDIUM STORING STREAM DATA GENERATING PROGRAM

(75) Inventors: Kazuho Tanaka, Fujisawa (JP); Takahiro Yokoyama, Yokohama (JP); Tomohiro Hanai, Tachikawa (JP); Satoru Watanabe, Yokohama (JP); Atsuro Handa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 560 days.

(21) Appl. No.: 12/626,041

(22) Filed: Nov. 25, 2009

(65) Prior Publication Data
US 2011/0060890 A1 Mar. 10, 2011

(30) Foreign Application Priority Data
Sep. 10, 2009 (JP) ................................. 2009-208820

(51) Int. Cl.
*G06F 17/00* (2006.01)
(52) U.S. Cl.
USPC ........................................... 707/759; 707/771
(58) Field of Classification Search
USPC .................................. 707/713–719, 759–779
See application file for complete search history.

(56) References Cited

U.S. PATENT DOCUMENTS

| 7,403,959 | B2 | 7/2008 | Nishizawa et al. | |
| 7,917,299 | B2 * | 3/2011 | Buhler et al. | 702/19 |
| 2007/0112714 | A1 * | 5/2007 | Fairweather | 706/46 |
| 2008/0256146 | A1 | 10/2008 | Nishizawa et al. | |
| 2009/0276373 | A1 * | 11/2009 | Rosenthal | 705/36 R |
| 2010/0010937 | A1 * | 1/2010 | Rosenthal | 705/36 R |
| 2010/0071000 | A1 * | 3/2010 | Amento et al. | 725/39 |

FOREIGN PATENT DOCUMENTS

| JP | 2002-199015 | 7/2002 |
| JP | 2006-338432 A | 12/2006 |
| JP | 2008-083808 A | 4/2008 |

OTHER PUBLICATIONS

Japanese Patent Office action on application No. JP-2009-208820 mailed Nov. 29, 2011; 1 page; translation 2 pages.
Japanese Patent Office office action on application No. 2009-208820 dated Apr. 26, 2011; pp. 1-3.
R. Motwani et al., "Query Processing, Resource Management, and Approximation in a Data Stream Management System," Proceedings of the 2003 CIDR Conference, Jan. 2003, 12 pgs.
E. Nesime Tatbul, "Load Shedding Techniques for Data Stream Management Systems," Brown University, May 2007, pp. 1-124.

* cited by examiner

*Primary Examiner* — Wilson Lee
(74) *Attorney, Agent, or Firm* — Foley Lardner LLP

(57) ABSTRACT

A stream data generating method for a computer system for generating stream data having time information applied thereto in a time series order and processing the generated stream data on the basis of a registered query. The computer system includes a storage for storing therein query information indicative of a plurality of sorts of constituent elements forming stream data corresponding to the query on the basis of the query and a stream definition indicative of the plurality of constituent elements, a data generator for generating and transmitting stream data; and a stream data processor for processing the stream data transmitted from the data generator. The data generator a less quantity of stream data to be transmitted to the stream data processor on the basis of the query information.

20 Claims, 12 Drawing Sheets

REGISTER STREAM s1

(c1 INTEGER, c2 VARCHAR (20));

REGISTER STREAM s2

(c1 INTEGER, c2 VARCHAR (20), c3 TIMESTAMP);

REGISTER QUERY q1

SELECT s1.c1, s2.c2

FROM S1[RANGE 1 MINUTE], s2[ROWS 3]

WHERE s1.c1 > 10 AND s2.c2 = 'AAA';

| STREAM NAME | SELECT | FROM | WHERE | |
|---|---|---|---|---|
| s1 | c1 | RANGE | c1 > 10 | 510 |
| s2 | c2 | ROWS | c2 = 'AAA' | 520 |
| ... | ... | ... | ... | |

FIG.6

| 1253 | |
|---|---|
| IDENTIFIER ITEM (601) | ADDRESS (602) |
| TRANSMITTER 1 | xxx.xxx.xxx.aaa |
| TRANSMITTER 2 | xxx.xxx.xxx.bbb |
| . . . | . . . |

FIG.7

| INTEGER (701) | VARCHAR (702) | |
|---|---|---|
| 5 | 'AAA' | 710 |
| 15 | 'BBB' | 720 |
| . . . | . . . | 730 |

| INTEGER (801) | VARCHAR (802) | TIMESTAMP (803) | |
|---|---|---|---|
| 10 | 'AAA' | 12:00:00 | 810 |
| 20 | 'BBB' | 13:00:00 | 820 |
| . . . | . . . | . . . | 830 |

| INTEGER | VARCHAR |
|---------|---------|
| 15      | –       |

| INTEGER | VARCHAR | TIMESTAMP |
|---------|---------|-----------|
| –       | 'AAA'   | –         |

| nop |
|-----|

START
↓
REGISTER/MODIFY QUERY — S1201
↓
CREATE QUERY INFORMATION TABLE — S1202
↓
TRANSMIT QUERY INFORMATION TABLE TO TRANSMITTER RECORDED IN TRANSMITTER MANAGEMENT TABLE — S1203
↓
END

| STREAM DATA NAME | RESIDUAL STREAMS COUNT |
|---|---|
| s1 | 10 |
| s2 | 100 |
| . . . | . . . |

1280, 1281, 1282

STREAM DATA GENERATING METHOD, STREAM DATA GENERATING DEVICE AND A RECORDING MEDIUM STORING STREAM DATA GENERATING PROGRAM

INCORPORATION BY REFERENCE

The present application claims priority from Japanese application JP2009-208820 filed on Sep. 10, 2009, the content of which is hereby incorporated by reference into this application.

BACKGROUND OF THE INVENTION

The present invention relates to stream data generating methods, stream data generating devices, and a recording medium storing stream data generating program, and more particularly, to a stream data generating method, a stream data generating device, and a recording medium storing stream data generating program for generating stream data in a stream data processing system.

In these years, a demand for a stream data processing system, which receives a large quantity of data (stream data) incoming at all times and processes the received data on real time basis, is increasing. For example, with respect to a financial application program for supporting stock transaction, one of most important objects of the application is to quickly cope with a variation in stock price. In this connection, when a prior art database management system (DBMS) processes data, the system is required to store the received stock data once in a storage. If the system treats a larger quantity of stock data in future, then it may possibly become difficult for the system to cope with a variation in stock price or the like on a real time basis.

Further, when an application program for processing such stream data on a real time basis is separately created, this involves problems with a prolonged development term, an increased development cost, and difficult quick coping with a change in business using the application. To this reason, a general-purpose stream data processing system has been demanded.

In the stream data processing system, a query (inquiry) is first register in the system, and the query is continually executed together with arrival of stream data. However, since such stream data arrives from time to time, it is impossible for the system to start processing all the data after already arrived. Further, the data arrived in the system are required to be processed according to their arrival order while not influenced by a data processing load.

In a technique disclosed in R. Motwani J. Widom, A. Arasu, B. Babcock, S. Babu, M. Datar, G. Manku, C. Olston, J. Rosenstein, and R. Varma: "Query Processing, Resource Management, and Approximation in a Data Stream Management System", In Proc. of the 2003 Conf. on Innovative Data Systems Research (CIDR), January 2003; a concept called a sliding window (which will be referred to merely as "window" hereinafter) that stream data are processed on a real time basis by specifying a width of time such as latest 10 minutes or a width of a streams count such as latest 1,000 streams and partly cutting the data streams with such a width, is introduced.

The aforementioned technique also discloses CQL (Continuous Query Language) which can specify a window as a language for describing a query for data acquisition. CQL is an extension of SQL (Structured Query Language) widely used in DBMS, enabling specification of a window. More specifically, techniques or the like utilizing CQL are disclosed, for example, in JP-A-2006-338432 and so on.

Since stream data are data incoming in large quantities from time to time, the stream data processing system, in some cases, cannot process such large quantities of data at a time. To avoid this, when stream data is stored in a plurality of queues, the system acquires stream data on the basis of queue status information so as not to lower the load of the entire system, as disclosed in JP-A-2008-83808. Further, a technique for avoiding reduction of the system processing capability by thinning stream data in the course of processing the stream data in a stream data processing system, is disclosed in Emine Nesime, Tatbul: "Load Shedding Techniques for Data Stream Management Systems", Ph. D, Brown University, May 2007. P 17-18, chap 3.2.

SUMMARY OF THE INVENTION

However, the techniques disclosed in JP-A-2008-8380 and in Emine Nesime, Tatbul: "Load Shedding Techniques for Data Stream Management Systems", Ph. D, Brown University, May 2007. P17-18, chap 3.2 are directed to methods of reducing the load of the stream data processing system by receiving stream data and then efficiently processing the received stream data. For this reason, even the techniques disclosed in JP-A-2008-8380 and in Emine Nesime, Tatbul: "Load Shedding Techniques for Data Stream Management Systems", Ph. D, Brown University, May 2007. P17-18, chap 3.2 are employed, the system cannot solve the aforementioned problems when the system receives a quantity of data beyond its acceptable level.

When it is required to process a large amount of stream data, it is necessary for the stream data processing system not only to efficiently process the stream data after reception thereof but also to reduce the quantity of stream data inputted to the system.

In this connection, query processing carried out in the stream data processing system is featured in that stream data or data about rows (columns) of data included in the stream data are selected, analyzed, and calculated. Due to such a feature, even when the system receives stream data, there occurs such a case that some queries registered in the system use only parts of their stream data or do not use their stream data at all.

It is therefore an object of the present invention to generate stream data whose quantity to be input to a stream data processing system can be reduced.

In accordance with a typical aspect of the present invention, there is provided a stream data generating method for a computer system which generates stream data having time information applied thereto in a time series order and which processes the generated stream data on the basis of a registered query. The computer system includes a storage for storing query information indicative of a plurality of sorts of constituent elements of the stream data corresponding to the query on the basis of the query and a stream definition indicative of the constituent elements of the stream data, a data generator for generating and transmitting the stream data, and a stream data processor for processing the stream data transmitted from the data generator. The data generator generates a less quantity of stream data from the stream data transmitted to the stream data processor on the basis of the query information.

In accordance with the present invention, processing efficiencies (for communication load, memory use capacity, calculation quantity, etc.) in a stream data processing system can be increased and a throughput latency performance can be enhanced.

BRIEF DESCRIPTION OF THE DRAWINGS

FIG. 3 shows an example of a stream definition registered in the first embodiment of the computer system of the present invention;

FIG. 4 shows an example of a query definition registered in the first embodiment of the computer system of the present invention;

FIG. 5 shows an example of a query information table created based on a query definition example in the first embodiment of the computer system of the present invention;

FIG. 6 shows a transmitter management table for managing a computer which transmits stream data in the first embodiment of the computer system of the present invention;

FIG. 7 shows an example of transmission data for stream data s1 in the first embodiment of the computer system of the present invention;

FIG. 8 shows an example of transmission data for stream data s2 in the first embodiment of the computer system of the present invention;

FIG. 9 shows an example of transmission data already thinned out for the stream data s1 in the first embodiment of the computer system of the present invention;

FIG. 10 shows an example of transmission data already thinned out for the stream data s2 in the first embodiment of the computer system of the present invention;

FIG. 11 shows an example of transmission data for informing of a fact of the thinned-out transmission data in the first embodiment of the computer system of the present invention;;

FIG. 12 is a flow chart showing a procedure of transmitting the query information table in the first embodiment of the computer system of the present invention;

DETAILED DESCRIPTION OF THE EMBODIMENTS

Explanation of Principle:

Explanation will be made in detail as to an embodiment of the present invention with reference to the accompanying drawings. The principle of a computer system in accordance with an embodiment of the present invention will first be explained by referring to a principle diagram of FIG. 1.

Figure 1:
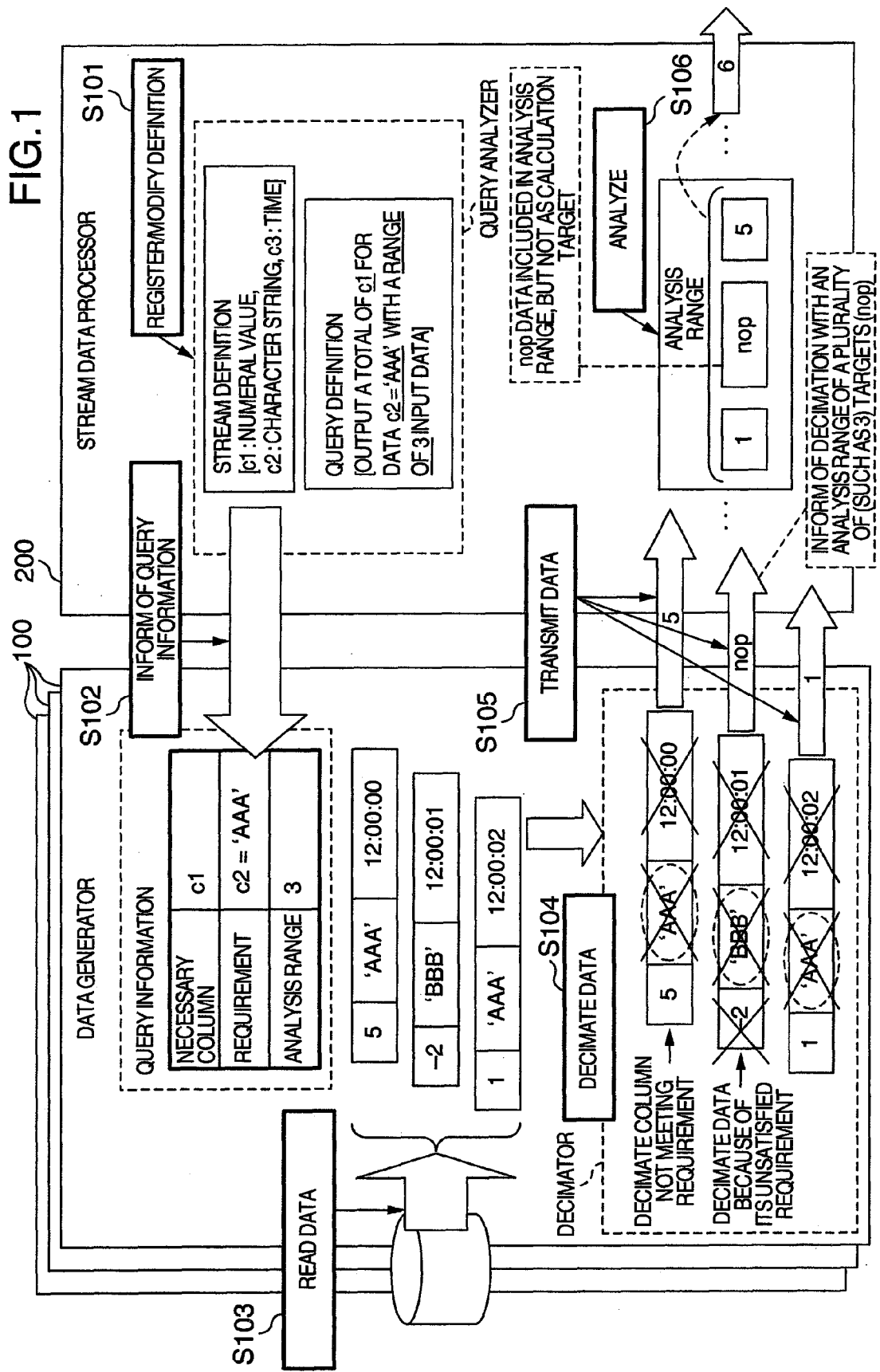
FIG. 1 shows a principle of a computer system to which the present invention is applied.

FIG. 1 shows, in a model form, functions of the computer system to which the present invention is applied. The computer system includes, as main featured constituent elements, a data generator 100 for generating and transmitting stream data and a stream data processor 200 for receiving, analyzing and calculating the stream data. The stream data generator is a functional part, for example, which can be implemented by means of cooperation of such a calculating device as a CPU and a program. In the illustrated example, the stream data generator is provided in the form a plurality of functions.

In a step S101, first of all, a stream definition 1263 and a query definition 1264 are registered or modified to the stream data processor 200. The stream definition indicates conditional elements for processing of stream data. In the illustrated principle diagram, $c_1$="numeral value", $c_2$="character train", and $c_3$="time" are given, as an example.

In a next step S102, the stream data processor 200 creates query information indicative of features of a registered stream definition and query definition and informs the data generator 100 of the created query information. In the example of FIG. 1, query information created in the step S102 has a column $c_1$ necessary as a analysis result of the query, a requirement $c_2$='AAA' for stream data as an analysis target, and an analysis range corresponding to 3 streams of data.

In a next step S103, the data generator 100 acquires (reads) data necessary to generate stream data from a database, and generates the stream data of divisions having time information applied in a time series order. (In FIG. 1, 3 pieces of data having time information "12:00:00" to "12:00:02".)

In a next step S104, the data generator 100 performs thinning operation over the acquired stream data. There are two types of thinning methods based on comparison between the query information and the stream data.

In one method, it is determined whether or not the stream data satisfies the requirement of the query information and, when its satisfaction is achieve, only necessary columns written in the query information are left and the other columns are decimated.

In the other method, it is determined whether or not the stream data satisfies the requirement of the query information and, its non-satisfaction is achieved, the stream data per se is decimated.

In a next step S105, the data generator 100 transmits the stream data to the stream data processor 200.

In a final step S106, the stream data processor 200 analyzes the stream data. In the example of FIG. 1, analysis is carried out based on a query definition that "a total of $c_1$ is output with a range of 3 pieces of input data". Thereafter, calculation is carried out and a calculation result is output. (In the example of FIG. 1, "6 is output as the calculation result".)

In this connection, an analysis range written in the query information is 3 corresponding to the number of pieces of input data. When all the stream data are decimated, the data generator generates data (which will be referred to as "nop (no-operation) data", hereinafter) to inform of the fact that the stream data per se was decimated, and transmits the generated data to the stream data processor 200. This is for the purpose of obtaining a correct analysis result by informing the stream data processor 200 of the nop data. In other words, the stream data processor 200 analyzes stream data, for example, corresponding to nearest 3 streams as its data number analysis range, the stream data processor is arranged to output a correct analysis result by analyzing all the 3 stream data. As a result, when the stream data per se is decimated, the stream data processor 200 cannot detect the decimated stream data as its analysis target and cannot output a correct analysis result. In order to avoid this, the nop data indicative of the decimation in place of the decimated data is informed to the stream data processor and thus the stream data processor can output a correct analysis result even for data not satisfying the requirement of the analysis target.

In more detail, in the case where the stream data processor analyzes, for example, an average value of nearest 3 streams of data; if first one of the three data streams is an analysis target and the other two streams are not its analysis targets, the 3 data streams have each a value of "n"; then its correct analysis result becomes "n/3". However, when the system is designed so that the data transmitter does not transmit such stream data that does not become an analysis target (that is, the data transmitter does not transmit the second and third streams of data), the stream data processor cannot detect the fact of no transmission of the 2 data streams. As a result, the stream data processor regards the subsequent stream data as analysis targets (performs analyzing operation over the fourth and fifth streams of data and the first stream of data) and thus cannot produce a correct analysis result.

Thus, when analysis is carried with a streams count range, the data generator 100 generates nop data when decimating stream data per se in the step S104, transmits the nop data in the transmitting operation of the step S105 (transmits the nop data in place of the second and third streams of data); whereas the stream data processor performs analyzing operation in such a manner that the nop data is included in its analysis range but is not treated as an analysis target and performs calculating operation in the step S106, thus enabling acquisition of a correct result.

A prior art computer system has a problem that since the stream data processor 200 analyzes all stream data including data not requested, a processing load is increased. In the present embodiment, meanwhile, part of various sorts of data in stream data required for its analysis is managed and part thereof not required is decimated, whereby the quantity of stream data to be analyzed by the stream data processor 200 can be reduced. Further, through the thinning or decimating operation, the stream data processor can output a correct analysis result, and the data generator can transmit the nop data in place of the decimated data. The principle of the computer system, to which the present invention is applied, has been explained above.

The aforementioned computer system has been explained in connection with the example wherein the data generator 100 applies time information to the respective streams of data as a method of generating stream data in the step S103. However, with regard to how to apply time information, not the data generator 100 but the stream data processor 200 may apply time information to the respective stream data in an order of reception of the stream data from the data generator 100.

Figure 2:
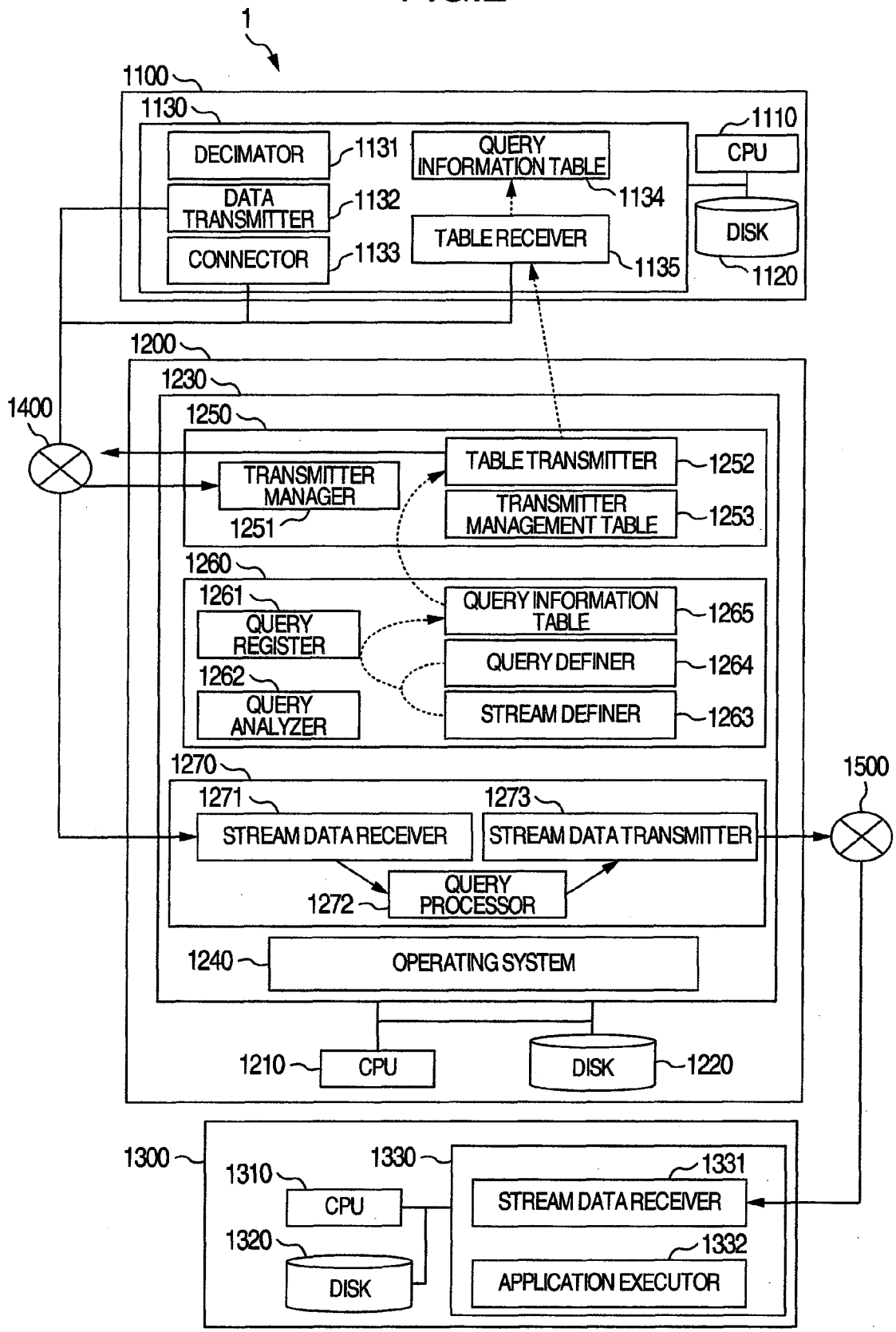
FIG. 2 shows a general configuration of a computer system to which the present invention is applied in accordance with a first embodiment of the invention.

Embodiment 1:

A first embodiment of the computer system, to which the present invention is applied, will next be explained in detail with reference to the attached drawings. FIG. 2 shows a general configuration of a computer system 1 in accordance with a first embodiment of the present invention.

The computer system 1 of the present embodiment includes a data transmitting computer 1100, a stream data processing computer 1200, and a result receiving computer 1300. The data transmitting computer 1100 and the stream data processing computer 1200 are interconnected by a network 1400, and the stream data processing computer 1200 and the result receiving computer 1300 are interconnected by a network 1500.

In the present embodiment, a program activated by cooperation with a CPU 1110 within the data transmitting computer 1100 corresponds to the function of the data generator 100 shown in the principle diagram of FIG. 1. A program activated by cooperation with a CPU 1210 within the stream data processing computer 1200 corresponds to the function of the stream data processor 200 shown in the principle diagram of FIG. 1. The data transmitting computer 1100, the stream data processing computer 1200, and the result receiving computer 1300 are interconnected by the network 1400 or 1500 to communicate therewith in the present embodiment. However, the present invention is not limited to the illustrated example, but these computers may be integrally formed in the form of a single unit or a combination or combinations thereof, as a matter of course. Although the present embodiment is arranged so that a decimator 1131 is provided in the data transmitting computer 1100, the decimator may be provided in an external interface of the stream data processing computer 1200 as an adaptor.

In the present embodiment, for simplicity of explanation, a single application program for generation, decimation, etc. of stream data is activated in the data transmitting computer 1100. However, a plurality of such application programs may be activated as necessary, as shown in the above principle diagram of FIG. 1.

Stream data include, as an example, stock price delivery information in a financial application, POS data in retail sale business, probe car information in a traffic information system, and an error log in computer system management.

The data transmitting computer 1100 has the CPU 1110, a disk 1120, and a memory 1130. The data transmitting computer 1100 is designed to generate stream data and transmits the stream data to the stream data processing computer 1200. The generation and transmission of stream data may be implemented by a program mounted on the data transmitting computer 1100, or may be implemented by exclusive hardware mounted on the data transmitting computer 1100.

The CPU 1110 executes a program on the memory 1130. The disk 1120 stores data for the program on the memory 1130 to use. The memory 1130 stores a program to be executed by the CPU 1110 and data necessary for executing the program.

The memory 1130 has, as functional areas, the decimator 1131 (corresponding to the function of the decimator in FIG. 1), a data transmitter 1132, a connector 1133, a query information table 1134 (corresponding to the query information in FIG. 1), and a table receiver 1135, based on cooperation between the program and the CPU 1110. The connector 1133 is connected with the stream data processing computer 1200, so that the table receiver 1135 receives the query information table 1134 from the stream data processing computer 1200 and generates stream data. The decimator 1131 performs its thinning operation over the stream data according to predetermined requirements on the basis of the query information table 1134. The data transmitter 1132 is connected to the stream data processing computer 1200 by the network 1400 to transmit the stream data thinned by the decimator 1131 to the stream data processing computer 1200. Data generated as stream data may be read out from the disk 1120 or may be created in the program as an example.

The stream data processing computer 1200 has the CPU 1210, a disk 1220, and a memory 1230. The stream data processing computer 1200 may be provided, for example, in the form of a computer system such as a blade type computer system or a PC server.

The stream data processing computer 1200 receives the stream data transmitted from the data transmitter 1132, analyzes the received data, and transmits the analyzed result to the result receiving computer 1300 via the network 1500.

The memory 1230 has a data transmitter manager 1250, a query manager 1260, and a stream data processor 1270, which are operated through cooperation between a program operating on an operating system 1240 or the operating system 1240 and the CPU 1210.

The data transmitter manager 1250 manages the data transmitting computer 1100. The data transmitter manager 1250 further includes a transmitter manager 1251, a table transmitter 1252, and a transmitter management table 1253. The transmitter manager 1251, when connected with the data transmitting computer 1100, records information on the data transmitting computer 1100 in the transmitter management table 1253. The transmitter management table 1253 contains information about the data transmitting computer 1100 connected to the stream data processing computer 1200, whose contents will be explained later in FIG. 6.

The table transmitter 1252 transmits a query information table 1265 possessed by the stream data processing computer 1200 to the data transmitting computer 1100 recorded in the transmitter management table 1253. The timing of transmitting the query information table 1265 may be, for example, when the data transmitting computer 1100 is connected to the stream data processing computer 1200 or when the stream data processing computer 1200 accepts a transmission request about the query information table 1265 from the data transmitting computer 1100.

The query manager 1260 is a functional part of managing a query about contents when the stream data processing computer 1200 analyzes stream data. The query manager 1260 further includes a query register 1261, a query analyzer 1262, a stream definer 1263 (corresponding to the stream definition in FIG. 1), a query definer 1264 (corresponding to the query definition in FIG. 1), and a query information table 1265.

The query register 1261 accepts registration of the query, and records the query in the stream definer 1263 and the query definer 1264. The registration of the query may be implemented by the stream data processing computer 1200 per se which issues a registration request or accepts a registration request from another computer.

The query analyzer 1262 creates the query information table 1265 based on the stream definer 1263 and the query definer 1264 recorded by the query register 1261. The timing for the query analyzer 1262 to create the query information table 1265 may be, for example, when the query register 1261 registers the query definer 1264 and the stream definer 1263 or when the query register 1261 accepts a request of creating the query information table 1265.

The stream definer 1263 indicates a type of a column in the input stream data (whose contents will be explained later in FIG. 3). The query definer 1264 indicates a method of analyzing stream data by the stream data processing computer 1200 (whose contents will be explained later in FIG. 4). The query information table 1265 indicates features of queries registered in the stream definer 1263 and the query definer 1264 (whose contents will be explained later in FIG. 5).

The stream data processor 1270 is a functional part which processes stream data. The stream data processor 1270 further includes a stream data receiver 1271, a query processor 1272, and a stream data transmitter 1273.

The stream data receiver 1271 receives stream data via the network 1400 from the data transmitter 1132 of the data transmitting computer 1100.

The query processor 1272 analyzes and calculates the stream data received by the stream data receiver 1271 on the basis of the query definer 1264.

The stream data transmitter 1273 transmits a result analyzed and calculated by the query processor 1272 via the network 1500 to the result receiving computer 1300.

The result receiving computer 1300 has a CPU 1310, a disk 1320, and a memory 1330. The result receiving computer 1300 receives and uses stream data based on the result analyzed and calculated by the stream data processing computer 1200. The processing of reception and use of the stream data may be implemented by a program on the result receiving computer 1300 or by exclusive hardware mounted on the result receiving computer 1300.

The disk 1320 stores data to be used by a program of the memory 1330. The memory 1330 stores the program to be executed by the CPU 1310 and data necessary for executing the program to form a stream data receiver 1331 and an application executor 1332 through cooperation with the CPU 1310.

The stream data receiver 1331 receives the stream data via the network 1500 from the stream data transmitter 1273 of the stream data processing computer 1200. The application executor 1332 uses the stream data received from the stream data receiver 1331. The use of the stream data includes, for example, storage in an external storage, display on a display device, and so on.

The networks 1400 and 1500 may be an Ethernet (registered trademark), a local area network (LAN) interconnected by optical fibers or the like, or a wide area network (WAN) including the Internet lower in transmission speed than the LAN.

The data transmitting computer 1100, the stream data processing computer 1200, and the result receiving computer 1300 may be each a personal computer or may form an arbitrary computer system such as a blade type computer system. The memories 1130, 1230 and 1330 may be each, for example, a volatile memory medium accessible at a high speed.

The configuration of the computer system 1 in accordance with the first embodiment of the invention has been explained above. However, the computer system 1 may also be arranged in various ways including direct reception of stream data or reception of stream data via another computer.

Explanation will next be made as to definition, tables and data contents in the present invention by referring to FIGS. 3 to 11.

FIG. 3 shows an example of the stream definer 1263. The stream definer 1263 defines the types of columns in stream data received by the stream data processing computer 1200 and also defines reference names. In the stream definer 1263, stream data s1 and s2 are defined. The stream data s1 has the first column having an integer type reference name c1 and the second column having a varchar (20) type reference name c2. The stream data s2 has the first column having an integer type reference name c1, the second column having a varchar (20) type reference name c2, and the third column having a timestamp type reference name c3.

FIG. 4 shows an example of the query definer 1264. The query definer 1264 defines contents of a query analyzed by the stream data processing computer 1200. In the example defined by the query definer 1264, a query q1 is defined so that a query name is "q1", columns to be selected are "c1 of s1" and "c2 of s2", the ranges of streams to be analyzed are "one minute of s1" and "3 streams of s2", and a requirement for the stream data to be selected is that "c1 of s1 is larger than 10 and c2 of s2 is 'AAA'".

FIG. 5 shows an example of the query information table 1265. The query information table 1265, which shows features of the query definer 1264, is used when the decimator 1131 of the data transmitting computer 1100 decimates stream data. The query information table 1265 has fields of STREAM NAME 501, SELECT 502, FROM 503, and WHERE 504, in which contents of the query definer 1264 are recorded respectively. In the shown example of the query information table, with respect to the stream data s1, c1 is recorded in the SELECT 502 as a column to be selected by the query, 'RANGE' indicative of analysis in a time range is recorded in the FROM 503, 'c1 is larger than 10' as a requirement for the select-target stream data is recorded in the WHERE 504.

The stream data processing computer 1200 can judge the fact that, for the stream name s1, only c1 having columns larger than 10 is required, by referring to the query information table 1265. When referring to the query information table 1265, the decimator 1131 can judge the fact that, for the stream name s1, it is sufficient to transmit only part of the stream data s1 satisfying the requirement of "having columns larger than 10", and the other data can be decimated. In the query information table 1265, The item field "FROM" 503 has "ROWS" indicative of analysis with a range of streams count, recorded in the field of the second row 520. In the case of the analysis of the streams count range, decimation of stream data per se causes a shift in the stream data as a target when the stream data processing computer 1200 analyze. For this reason, by referring to the query information table 1265, the decimator 1131, when decimating stream data per se with respect to the stream data s2, can judges that the decimator is required to inform the fact of the decimation.

FIG. 6 shows an example of the transmitter management table 1253. The transmitter management table 1253 is a table for management of the data transmitting computer 1100 connected to the stream data processing computer 1200. In this connection, "connection" refers to processing necessary for the data transmitting computer 1100 and the stream data processing computer 1200 to secure a communication path. In the present embodiment, the transmitter management table 1253 shows an example of having an identifier item 601 and an address item 602. The stream data processing computer 1200, each time connected with the data transmitting computer 1100, the identifier and address of the data transmitting computer 1100 are stored in the transmitter management table 1253.

FIG. 7 shows an example of transmission data for the stream data s1. Stream data 710 has an integer type value of "5" in the first column 701 and a varchar type value of "AAA" in the second column 702.

FIG. 8 shows an example of transmission data for the stream data s2. The stream data 810 has an integer type value of "10" in the first column 801, a varchar type value of "AAA" in the second column 802, and a timestamp type value of "12:00:00" in the third column 803.

FIG. 9 shows an example of already-decimated transmission data for the stream data s1. Stream data 910 has an integer type value of "15" in the first column, and no data in the second column 902. The decimator 1131, by referring to the query information table 1265, can judge that, with respect to the stream data s1, it is only required to transmit data for c1 having stream data larger than 10 of c1. Since the stream data 710 has a value of c1 smaller than 10 (that is, has a value of "5"), the stream data 710 per se will not decimated and nor transmitted. Since the stream data 720 has a value of c1 larger than 10 (that is, has a value of "15"), stream data 910 is created by decimating data of the stream data 720 other than c1.

FIG. 10 shows an example of transmission data of s2 already decimated. Stream data 1010 has a varchar type of value "AAA" in the second column 1002 and no data in the first and third columns 1001 and 1003. The decimator 1131, by referring to the query information table 1265, can judge that it is only required to transmit data c2 of stream data having c2 of "AAA" for s2. Stream data 810 is a target to be transmitted because it has c2 of "AAA", and by decimating data of the stream data 810 other than c2, the stream data 1010 is created.

FIG. 11 shows an example of the nop data 1100 for informing of the fact that stream data per se was decimated. Though the nop data is included in the analysis range in the stream data processing computer 1200, it is not an analysis target. In order that decimation of stream data per se prevents stream data not included by nature in the same analysis range from being analyzed, the nop data is employed. Since the stream data 820 has c2 of a value of "BBB", the decimator 1131 decimates the stream data per se. At this time, in the query information table 1265, the stream data s2 is set to have a FROM of "ROWS", which data is to be analyzed with the streams count range. To this end, the decimator 1131 creates the nop data 1100 indicative of "having decimated" in place of the stream data 820.

Explanation will next be made as to a flow of processing in the present embodiment by referring to FIGS. 12 to 17.

FIG. 12 shows a processing flow when the stream data processing computer 1200 creates the query information table 1265 upon query registration and transmits it to the data transmitting computer 1100. In a step S1201, first, the query register 1261 accepts the query definer 1264 and the stream definer 1263.

In a step S1202, next, the query analyzer 1262 creates the query information table 1265.

In a next step S1203, the table transmitter 1252 transmits the query information table 1265 to the table receiver 1135 of the data transmitting computer 1100.

Through the processing operations of the steps S1202 and S1203, the query information table 1265 of the data transmitting computer 1100 has the same contents as the query information table 1134 of the data transmitting computer 1100.

In this connection, as a method when the data transmitting computer 1100 acquires the query information table 1134, the data transmitting computer 1100 may transmit a transmission request for the query information table 1134 and the table transmitter 1252 may receive the transmission request. On the contrary, the table transmitter 1252 may transmits a transmission request for the query information table 1134 to the data transmitting computer 1100 and the data transmitting computer 1100 may receive the transmission request. Or the table transmitter 1252 may transmit the query definer 1264 to the data transmitting computer 1100, and the data transmitting computer 1100 may create the query information table 1134. Further, both of the stream data processing computer 1200 and the data transmitting computer 1100 register the query definition to create the query information table 1134. Or the data transmitting computer 1100 may accept a registration request for the query information table 1134 from another external terminal device (such as a management terminal connected with the computer system and the network).

Figure 13:
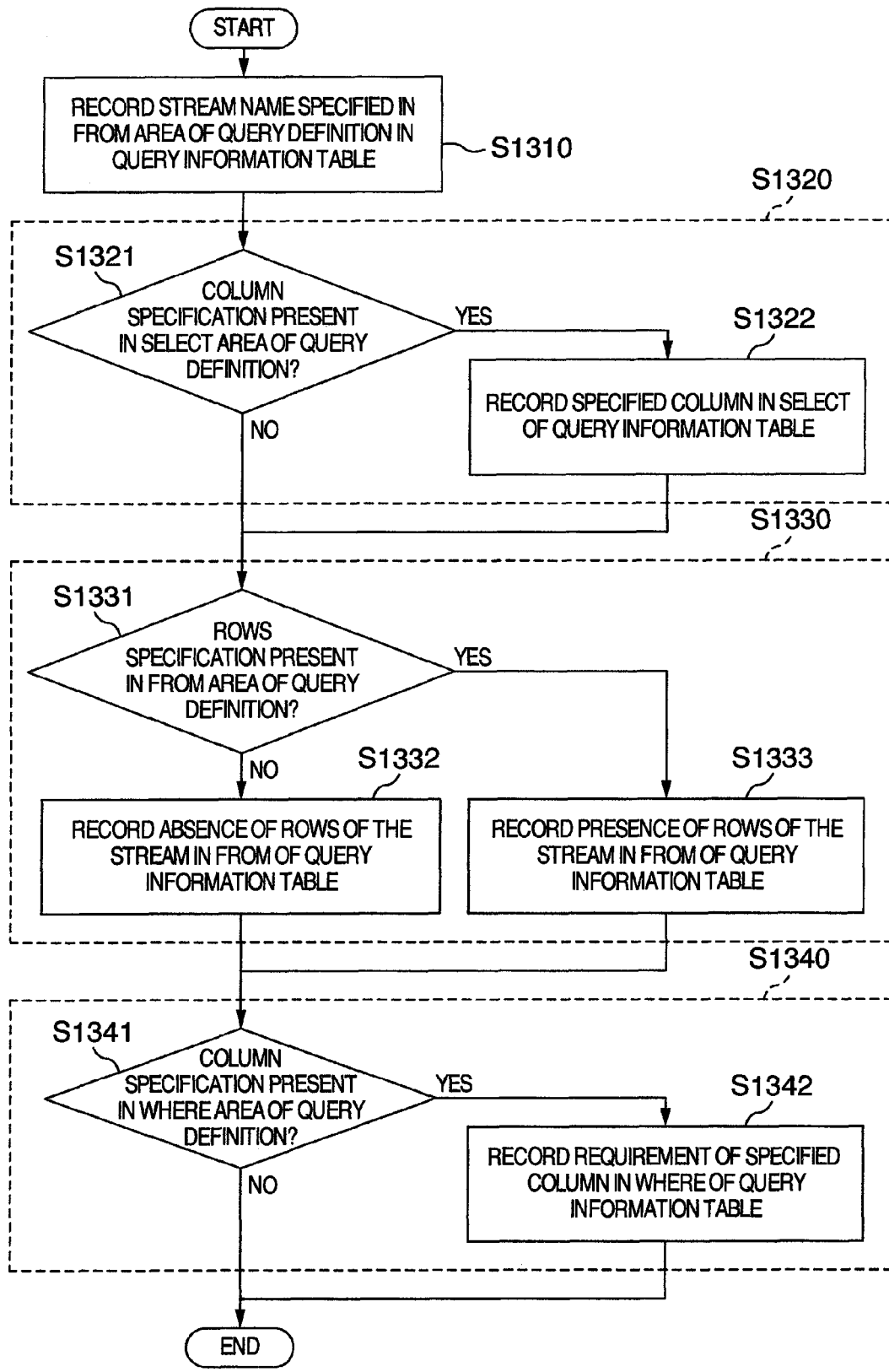
FIG. 13 is a flow chart showing a procedure of creating the query information table in the first embodiment of the computer system of the present invention.

FIG. 13 shows a processing flow when the query information table 1134 is created by the data transmitting computer 1100. The creation of the query information table 1265 is carried out when the query register 1261 analyzes the query definer 1264. A specific example of the creation of the query information table 1134 will be explained with use of the example of the query definer 1264 shown in FIG. 4 and the example of the query information table 1265 shown in FIG. 5.

When the creation of the query information table 1134 is started, in a step S1310, the data transmitting computer 1100 first records a stream name specified in the FROM field of the query definer 1264 in the STREAM NAME field 501 of the query information table 1265. More specifically, since the stream data s1 and s2 are specified in the FROM field of the query definer 1264, the stream data s1 and s2 are recorded in the STREAM NAME 501 of the query information table 1265.

In a next step S1320, recording of the SELECT 502 is carried out. In a step S1321, the computer system first judges presence or absence of specification of a column in the SELECT area of the query definer 1264. In the absence of the column specification, the computer system goes to a step S1330. In the presence of the column specification, the computer system records, in a step S1322, the specified column in a stream row corresponding to the SELECT 502 of the query information table 1265. More in detail, since "s1.c1" and "s2.c2" are specified in the SELECE field of the query definer 1264, "c1" and "c2" are recorded in the rows 510 and 520 of the SELECT 502 having the corresponding stream names recorded therein in the query information table 1265, respectively.

In a next step S1330, the recording of the FROM 503 is carried out. In a step S1331, the computer system judges presence or absence of ROWS specification in the FROM area of the query definer 1264. In the absence of the ROWS specification, the computer system records in a step S1332 the fact of absence of ROWS in the FROM field 503 of the query information table 1265. In the presence of the ROWS specification, the computer system records, in a step 1333, the fact that ROWS is present in the FROM field 503 of the query information table 1265. More specifically, since the ROWS specification is made by not s1 but s2 in the FROM field of the query definer 1264, the computer system records RANGE and ROWS in the rows 510 and 520 of the FROM field 503 having the corresponding stream names recorded therein in the query information table 1265. In this connection, the FROM field 503 is required to indicate whether or not the stream is analyzed with the streams count range, but contents recorded therein are not concerned. In the case of ROWS, for example, "O" is given and otherwise "X" is given or no record is given.

In a step S1340, recording of the WHERE 504 is carried out. In a step S1341, the computer system first judges presence or absence of column specification in the WHERE area of the query definer 1264. In the absence of the column specification, the computer system terminates its operation of creating the query information table 1134. In the presence of the column specification, the computer system, in a step S1342, records requirements of the specified column in the WHERE 504 of the query information table 1265. More specifically, in the WHERE area of the query definer 1264, "s1.c1>10" and "s2.c2='AAA'" are shown. Thus, the computer system records "c1>10" and "c2='AAA'" in the corresponding rows 510 and 520 of the WHERE 504 in the query information table 1265. In this connection, if the computer system can judge whether or not to decimate the stream data per se, then requirements to be recorded in the WHERE 504 becomes arbitrary. For example, requirements to be recorded therein is "decimate" or "not decimate".

Recording of the SELECT 502, the FROM 503 and the WHERE 504 is considered to be carried out in an arbitrary order.

Figure 14:
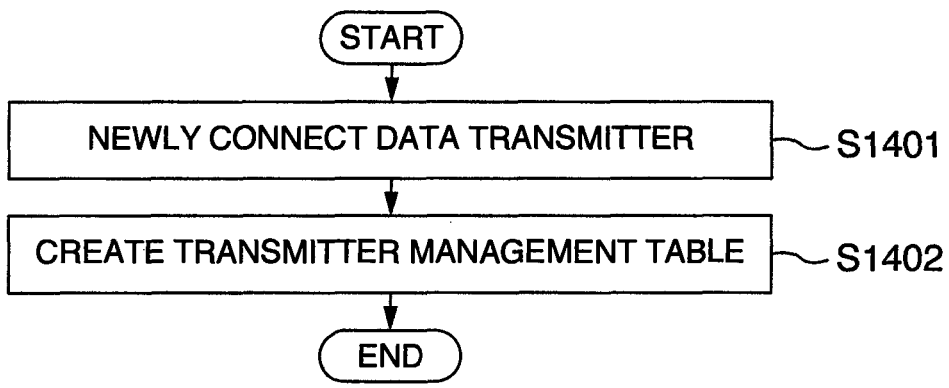
FIG. 14 is a flow chart showing a procedure of updating the transmitter management table in the first embodiment of the computer system of the present invention.

FIG. 14 shows a flow of creating the transmitter management table 1253. In a step S1401, the connector 1133 of the data transmitting computer 1100 is first connected to the stream data processing computer 1200. At this time, the transmitter manager 1251 starts creating the transmitter management table 1253.

In a step S1402, the transmitter manager 1251 stores an identifier and address of the connected data transmitting computer 1100 in the transmitter management table 1253.

Figure 15:
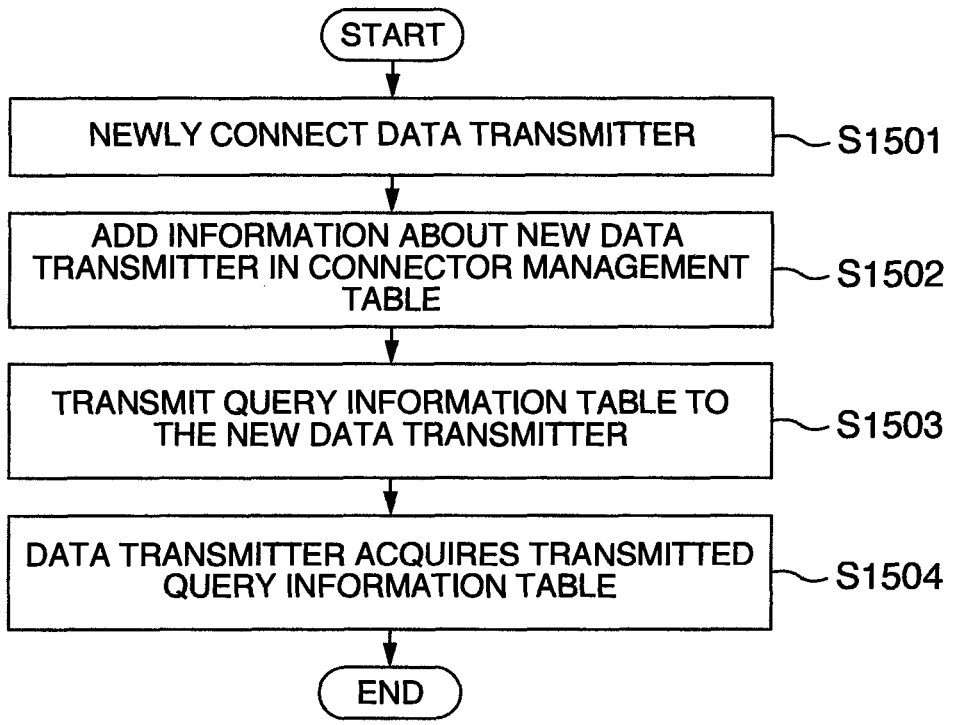
FIG. 15 is a flow chart showing a procedure of transmitting the query information table in the first embodiment of the computer system of the present invention.

FIG. 15 shows a flow of transmitting the query information table 1265 from the stream data processing computer 1200 to the data transmitting computer 1100. Steps S1501 and S1502 show the processing operations after the data transmitting computer 1100 is connected until the transmitter management table 1253 is created, which has been already explained in FIG. 14.

In the step S1502, the table transmitter 1252 of the stream data processing computer 1200 acquires information about the data transmitting computer 1100 newly connected from the transmitter management table 1253, and transmits the query information table 1265 to be directed to the data transmitting computer 1100.

In a next step S1503, the table receiver 1135 of the data transmitting computer 1100 receives contents of the transmitted query information table 1265 and updates the query information table 1134.

Figure 16:
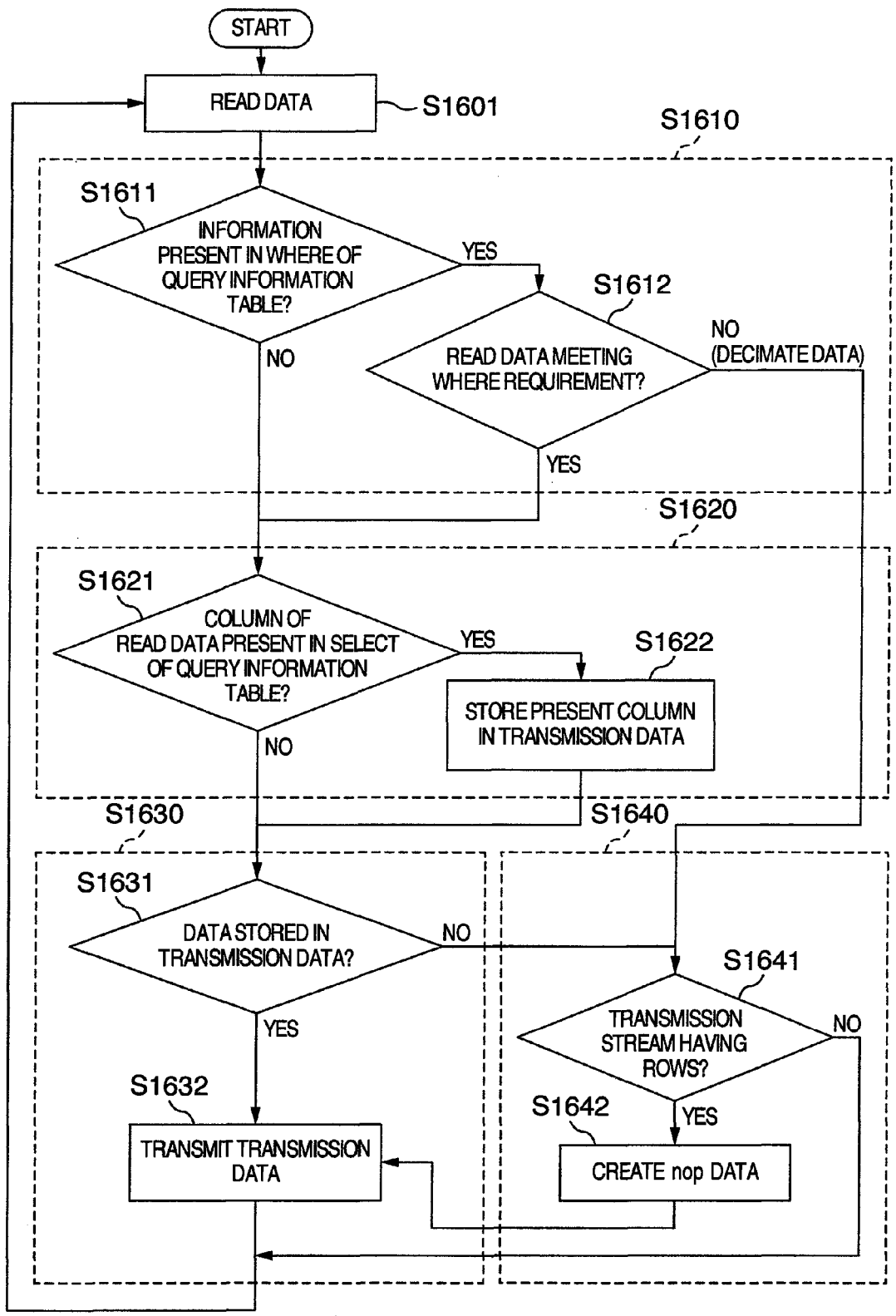
FIG. 16 is a flow chart showing a procedure of thinning out stream data in the first embodiment of the computer system of the present invention.

FIG. 16 shows decimating operations from creation of stream data by the decimator 1131 of the data transmitting computer 1100 to transmission of the stream data. In a step S1601, the decimator 1131 reads out data as original stream data to be transmitted from the disk 1120. More specifically, the decimator reads out, for example, the transmission data 700 as s1 or the transmission data 800 as s2 from the disk. It is only required in the step S1601 to be able to create the transmission originator data. Thus, not only such originator data may be obtained from the disk 1120 but also may be created within the data transmitting computer 1100. Or such data may be accepted from another computer or be input directed from an external terminal.

In a step 1610, the decimator 1131 decimates the stream data per se. In a step S1611, the decimator 1131 first judges presence or absence of an indication in the WHERE 504 of the query information table 1134. In the absence of an indication, control goes to a step S1620. In the presence of an indication, control goes to a step S1612.

In the step S1612, the decimator 1131 judges whether or not the read data satisfies requirements of the WHERE 504. In the case of satisfaction, control goes to a step S1621 to transmit the data. Otherwise, control goes to a step S1633 to decimate the data per se. More specifically, since there is an indication in the WHERE 504 of the stream data s1 in the query information table 1265, control goes to the step S1612. Since the transmission data 710 of s1 has "c=5" which fails to meet the requirement "c1>10" in the WHERE 504 of the query information table 1265, the decimator regards the data per se as to be decimated and control goes to a step S1641. Since the transmission data 720 of s1 has "c=15" which meets the requirement "c1>10" in the WHERE 504 of the query information table 1265, control goes to a step 1621 to transmit the data. The same holds true even for read data of s2.

In a step S1620, column thinning operation is carried out. In the step S1621, the decimator first judges whether or not the column of the read data is indicated in the SELECT 502 of the query information table 1265. In the presence of a column indication, control goes to a step S1622. In the absence of a column indication, control goes to the step S1631.

In the step S1622, the column indicated in the SELECT 502 is recorded from the read data in transmitting stream data. More specifically, "c1" is written in the SELECT 502 of the query information table 1265 in the row 510 as an s1 select target. Thus, the first column of the s1 transmitting data 720 set as a transmission target in the step S1610 is recorded in the first column 901 of the s1 decimated transmission data. The second column is made to be null because no indication in the SELECT 502. Even when the read data is for s2, column is decimated similarly. Through the operation of the step S1620, decimated transmission data is created.

In a step S1630, the decimator judges necessity or non-necessity of transmitting the stream data for the next transmitting operation. In the step S1631, the decimator judges whether or not a value is recorded in the transmission data. In the presence of a value, control goes to a step S1632; whereas, in the absence of a value, control goes to the step S1641.

In the step S1632, the data transmitting computer 1100 transmits the stream data to the stream data receiver 1271 of the stream data processing computer 1200. More specifically, since a value is recorded in the s1 decimated transmission data 910 in the first column created through the operations of the steps S1610 and S1620, the s1 decimated transmission data 910 is transmitted to the stream data processing computer 1200.

In the step S1640, operation in the absence of data to be transmitted is carried out. In the step S1641, it is judged whether or not the transmission destination stream is analyzed with the streams count range. When analysis is carried out with the streams count range, control goes to a step S1642, and otherwise, no data transmission is carried out and control goes to the step S1601 to read the next data.

Nop data 1100 is created as transmitting data in the step S1642, and the nop data is transmitted in the step S1632. More specifically, when the s1 transmission data 710 per se is decimated in the step S1632, control goes to the step S1641. From observation of the row 510 in the FROM 503 of the query information table 1265 in the row 510, it will be seen that s1 is analyzed not with the streams count range but with "RANGE". For this reason, the s1 transmission data 710 is not transmitted to the stream data processing computer 1200. Since the s2 transmission data 820 fails to meet the requirement of the WHERE in the step S1612, control goes to the step S1641. From observation of the FROM 503 of the query information table 1265 in the row 520, it will be seen that s2 is analyzed with "ROWS" and with the streams count range. For this reason, nop data 1100 is created and transmitted, which informs the stream data processing computer of the fact that the s2 transmission data was decimated.

Through the processing flow of FIG. 16, data creation, decimation and transmission are carried out. In this connection, the timing of decimating data can be made arbitrary so long as the decimation is carried out before data transmission. For example, data is read in in the step S1611 and thereafter the data per se or a column thereof is decimated as explained in FIG. 16. Or after necessity or non-necessity of decimation of data or its column is judged, necessary data or its column alone may be read in as transmitting data.

Figure 17:
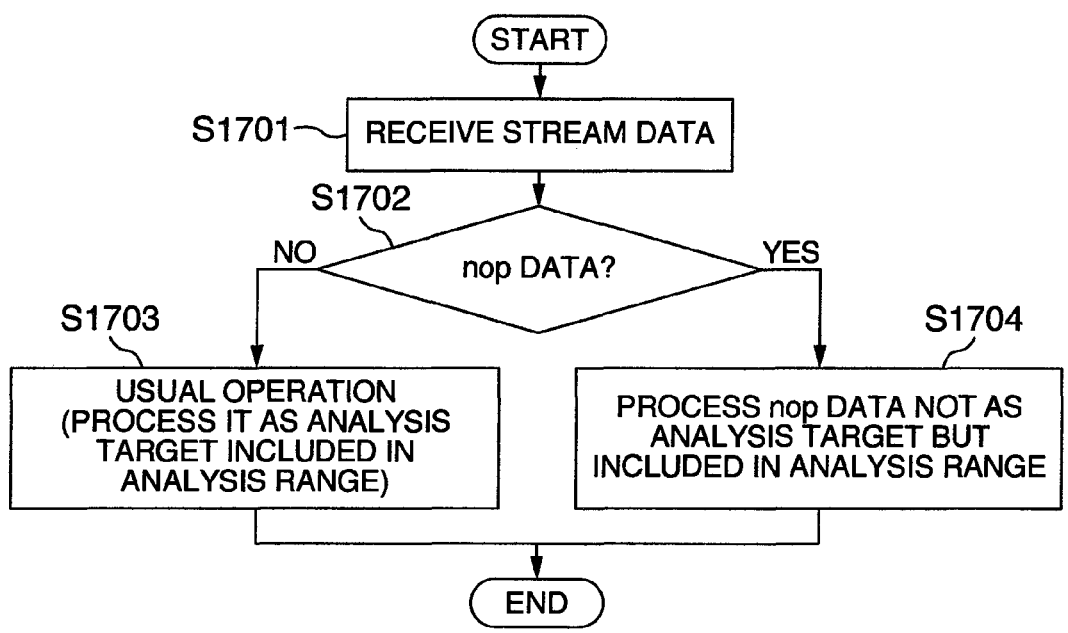
FIG. 17 is a flow chart showing a procedure when the system receives stream data in the first embodiment of the computer system of the present invention.

FIG. 17 shows a flow when the stream data receiver 1271 of the stream data processing computer 1200 receives stream data.

In a step S1701, the stream data receiver 1271 first receives stream data.

In a next step S1702, it is judged whether or not the stream data received by the query processor 1272 is nop data. In the case of the nop data, control goes to a step S1703 to process the stream data as usual. That is, the received stream data is included in a query analysis range and processed as a query analysis target.

If the received stream data is nop data, then the query processor process the received data as the nop data in a step S1704. In the case of reception of the nop data, the received data is included in the query analysis range but not analyzed and subjected to query operation. For example, in the case of a query of finding a total value for 3 pieces of stream data as when the first stream data has a value of 1, and the second stream data has a value of 2 and the third stream data has nop data; 1+2 is calculated and 3 is derived as their total value. At this time, the nop data is included in a range corresponding to 3 streams, but does not affect the calculation of the total value.

The first embodiment of the computer system 1 of the present invention has been explained above.

Variation of First Embodiment:

Explanation will then be made as to a variation of the first embodiment. The variation is featured in that it is judged whether or not to create nop data even when analysis is made with the query analysis range further including a time range in the first embodiment.

Even when analysis is made with the time rage, such a query as to consider the number of pieces of stream data as an analysis target results in that query processing result becomes incorrect when the stream data per se is decimated. Such a query as to consider the number of streams includes a query fir finding the number of pieces of stream data and a query for finding an average value of stream data as analysis targets. In this embodiment, it is assumed to create and transmit nop data even for such a streams-count considering query.

Through the flow of FIG. 13 of creating the query information table 1134, the data transmitting computer first judges whether or not the query considers the number of streams with the time range, and records it in the query information table 1134. More specifically, when the query considers the number of streams with the time range for example, the data transmitting computer records "RANGE_COUNT" in the FROM 503 of the query information table 1134 or in a new column of the query information table 1134.

In the flow of decimating operation shown in FIG. 16, when there is no transmission data in the step S1640, the data transmitting computer judges whether or not the transmission destination stream has ROWS in the step S1641, and similarly judges whether or not the transmitting stream considers the streams count with the analyzed time range. When the stream considers the streams count, the data transmitting computer creates and transmits nop data. When the stream does not consider the streams count, control goes to the step S1601 to read the next data. More specifically, for example, when "RANGE_COUNT" is recorded in the FROM 503 of the query information table 1134, the data transmitting computer creates and transmits nop data. Otherwise, the system reads the next data.

Embodiment 2:

Explanation will next be made as to a computer system 2000 in accordance with a second embodiment of the present invention. In the second embodiment, judgment of whether or not to decimate stream data is made according to the number of residual stream data.

Figure 18:
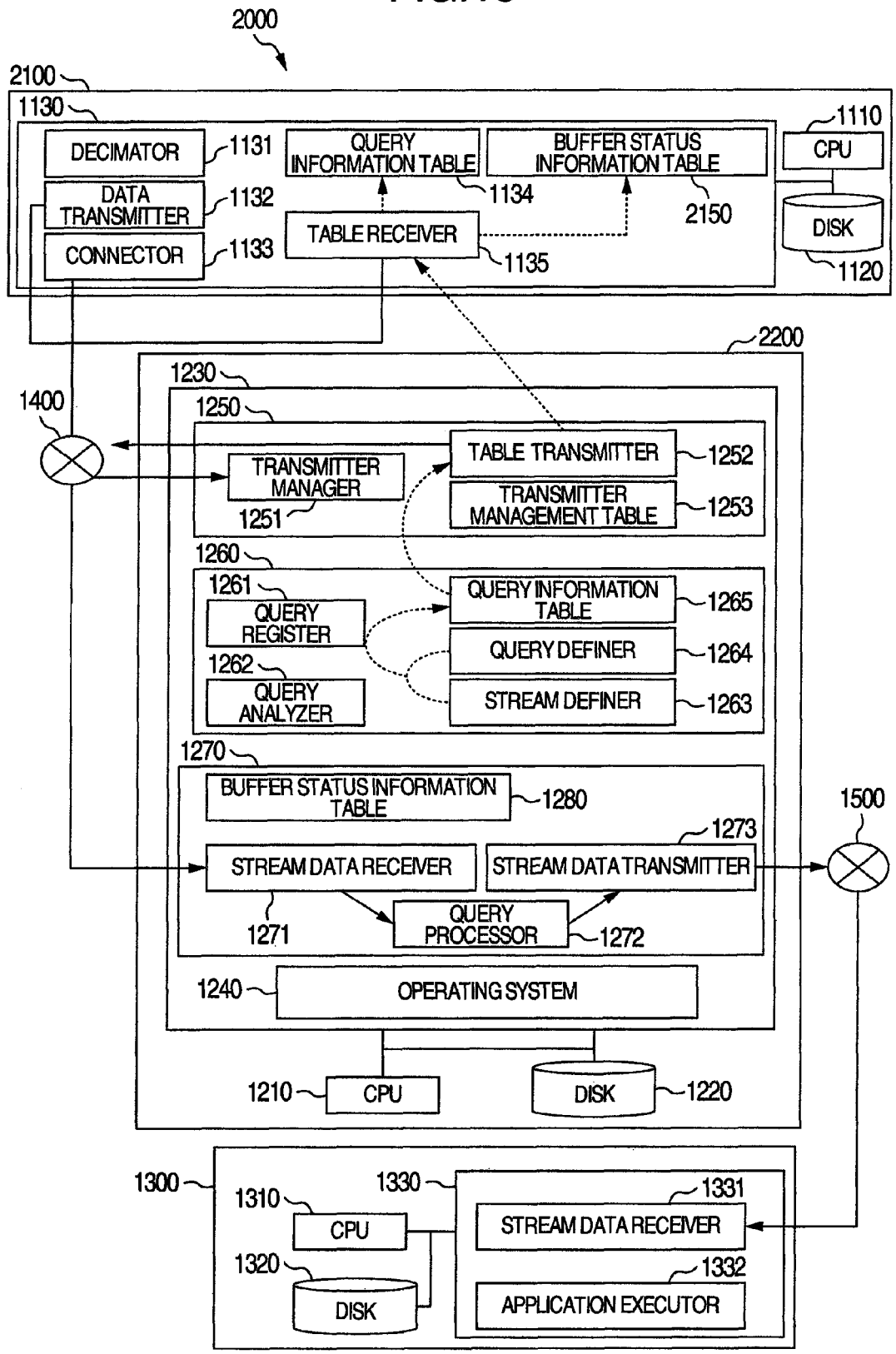
FIG. 18 shows a general configuration of a computer system to which the present invention is applied in accordance with a second embodiment of the present invention.

FIG. 18 shows a configuration of the computer system 2000 according to the second embodiment. In the following explanation, functional constituent elements of the computer system 2000 having the same or similar functions as or to those in the computer system 1 are denoted by the same reference numerals, detailed explanation thereof is omitted, and only differences between the systems will be explained in detail.

The computer system 2000 of FIG. 18 is different from the computer system 1 of the first embodiment especially in that a data transmitting computer 2100 has a buffer status information table 2150, a stream data processing computer 2200 has a buffer status information table 1280, and a decimator 2110 performs its decimating operation according to the number of residual stream data while referring to the buffer status information table 2150.

Figures 19, 20:
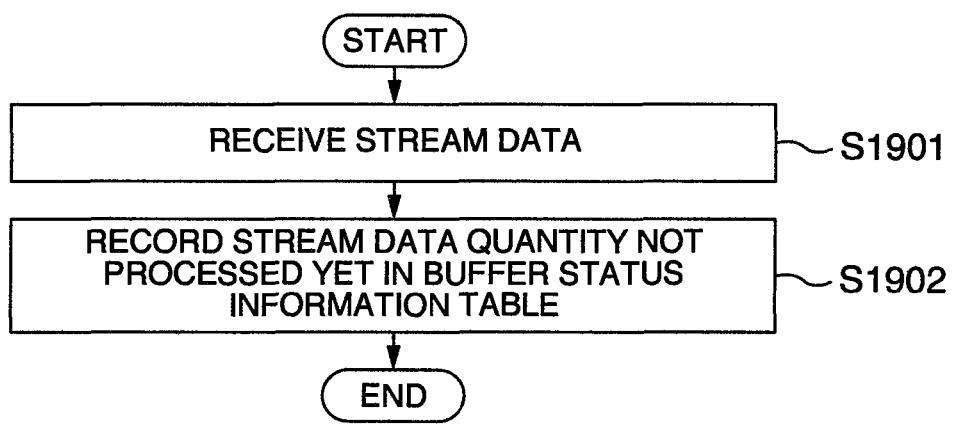
FIG. 19 shows an example of a status of a buffer for receiving stream data in the second embodiment of the present invention.
FIG. 20 is a flow chart showing a procedure of updating a buffer status information table in the second embodiment of the present invention.

FIG. 19 shows the buffer status information table 1280 in the stream data processing computer 2200. Recorded in the buffer status information table 1280 are the quantities of different data streams received by the stream data processing computer 2200. More specifically, the buffer status information table 1280 has data recorded in item fields of a stream data name 1281 and a residual streams count 1282.

Explanation will then be made as to a processing flow with the buffer status information table 1280 considered.

FIG. 20 shows a flow of updating the buffer status information table 1280.

In a step S1901, the stream data receiver 1271 of the stream data processing computer 2200 first receives stream data.

In a next step S1902, the stream data receiver 1271 records the quantity of stream data which is received by the stream data receiver 1271 but not processed yet by the query processor 1272, in the buffer status information table 1280 for each of the accepted streams. More specifically, the stream data receiver 1271 records streams accepted by the stream data receiver 1271 in the stream data name 1281 of the buffer status information table 1280, and also records the quantity of streams in the residual streams count 1282 thereof. In this connection, it is only required for the buffer status information table 1280 to be able to indicate the processing status of the stream data processing computer 2200. The residual streams count 1282 may be the quantity of stream data not processed yet by the query processor 1272, the entire quantity of stream data as an analysis target of the query processor 1272, or the quantity of stream data analyzed and output based on the received stream data. The timing of updating the buffer status information table 1280 may be when stream data is received or the updating may be made periodically.

Figure 21:
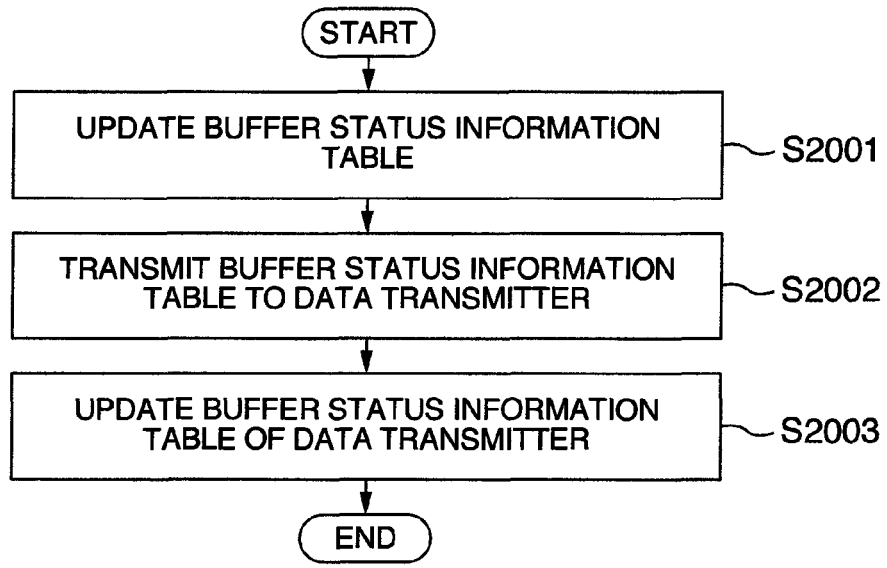
FIG. 21 is a flow chart showing a procedure of transmitting the buffer status information table in the second embodiment of the present invention.

FIG. 21 shows a flow when the buffer status information table 1280 is transmitted to the data transmitting computer 2100. In a step S2001, the buffer status information table 1280 of the stream data processing computer 2200 is first updated.

The table transmitter 1252 next transmits the buffer status information table 1280 of the stream data processing computer 2200 to the data transmitting computer 2100.

In a next step S2003, the table receiver 1135 of the data transmitting computer 2100 receives the transmitted buffer status information table 1280, and updates the buffer status information table 2150 of the data transmitting computer 2100. In this connection, the timing of transmitting the buffer status information table may be set arbitrarily so long as the stream data status of the stream data processing computer 2200 can be informed to the data transmitting computer 2100. For example, the transmission of the buffer status information table may be carried out when the buffer status information table 1280 is updated as shown in the step S2001 or may be carried out periodically.

Figure 22:
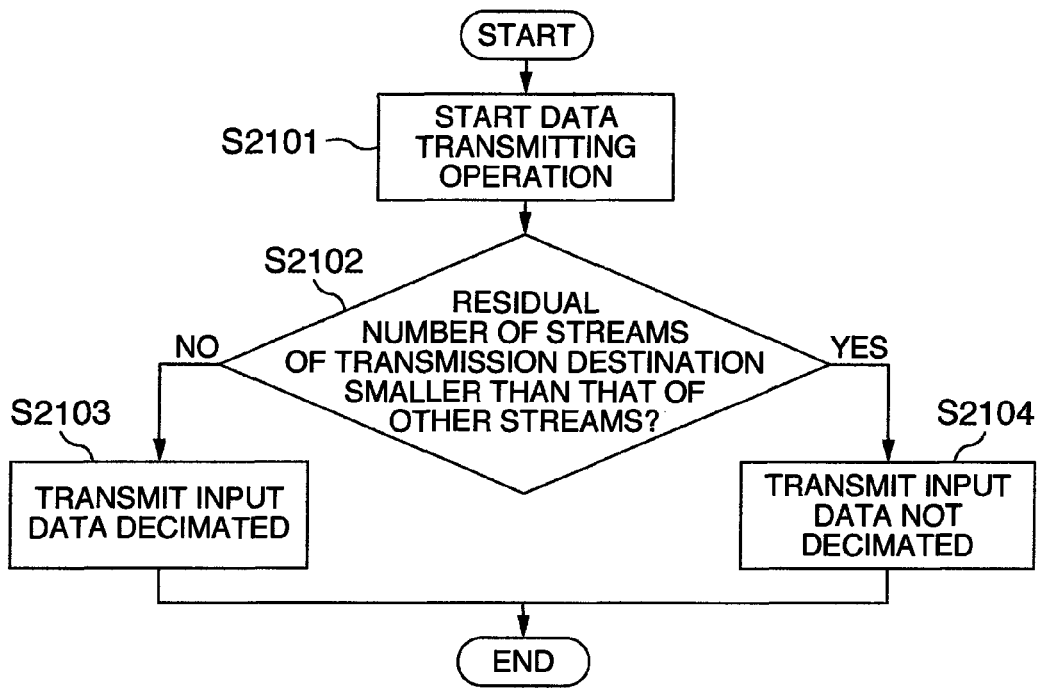
FIG. 22 is a flow chart showing a procedure of thinning out stream data according to the buffer status information table in the second embodiment of the present invention.

FIG. 22 shows a flow of decimating operation of the decimator 2110 when carried out with the buffer status information table 2150 being considered in the data transmitting computer 2100.

In a step S2101, the data transmitting computer 2100 first performs stream data transmitting operation.

In a next step S2102, the decimator 1131 compares the residual streams count 1282 of stream data of a transmission destination with that of other stream data by referring to the buffer status information table 2150. When the number of streams of the transmission destination is smaller than the number of other residual streams, control goes to a step S2104. When the streams count of the transmission destination is larger than the number of the other streams, control goes to a step S2103.

The operation of the step S2103 is to decimate and transmit the stream data, which is similar to the decimating operation of FIG. 16.

The operation of the step S2104 is to transmit the stream data without decimating it. That is, as in the operations of the steps S1601 and S1632 in FIG. 16, read-in data is transmitted as stream data as it is.

In this connection, judgment of whether or not to perform decimating operation in the step S2102 may be made at an arbitrary time. For example, the decimation judgment may be made before or after data is read in in the step S1601 or may be made periodically.

The operation of FIG. 22 enables leveling of processing statuses of streams in the stream data processing computer 2200 and exclusion of influences by slow processing streams.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A stream data generating method for a computer system for generating stream data having time information applied thereto in a time series order and processing the generated stream data on the basis of a registered query, said computer system comprising:

a storage for storing query information including (1) column information indicating the columns to be analyzed as an analyzing target in the stream data, (2) range information indicating the range of data within the columns indicated in the column information to be analyzed as the analyzing target, and (3) condition information indicating a condition under which the analyzing target indicated in the range information is to be analyzed;

a data generator for generating and transmitting the stream data; and a stream data processor for analysis processing the stream data transmitted from the data generator, wherein said data generator executes a step of generating a lesser quantity of stream data from the stream data transmitted to the stream data processor on the basis of the query information.

2. A stream data generating method according to claim 1, wherein the query information is information indicative of the column information to be processed or not to be processed by the stream data processor on the basis of the query, and the stream data processor executes a step of creating the query information.

3. A stream data generating method according to claim 2, wherein the stream data processor executes the step of creating the query information when the query is registered.

4. A stream data generating method according to claim 2, wherein the stream data processor executes a step of transmitting the query information to the data generator when the stream data processor is connected to the data generator.

5. A stream data generating method according to claim 2, wherein the stream data processor executes steps of accepting a transmission request of said query information from the data generator, and transmitting the query information to the data generator when the stream data processor accepts the transmission request.

6. A stream data generating method according to claim 2, wherein the data generator executes steps of accepting a transmission request of the query information from the stream data processor, and acquiring the query information when the data generator accepts the transmission request.

7. A stream data generating method according to claim 1, wherein the data generator executes a step of acquiring the query information from outside of the computer system.

8. A stream data generating method according to claim 2, wherein the step of creating a less quantity of stream data from the stream data transmitted to the stream data processor in the data generator includes a step of generating and transmitting stream data not containing the column information not processed by the query.

9. A stream data generating method according to claim 2, wherein the step of creating a less quantity of stream data from stream data transmitted to the stream data processor in the data generator includes a step of not generating stream data containing the column information not to be processed by the stream data processor on the basis of the query information.

10. A stream data generating method according to claim 1, wherein the data generator executes a step of informing the stream data processor of the fact that the less quantity of stream data was generated.

11. A stream data generating method according to claim 9, wherein the stream data processor processes stream data received from the data generator in a predetermined quantity, and the data generator executes a step of informing non-generation of stream data containing the column information not to be processed by the stream data processor on the basis of the query information.

12. A stream data generating method according to claim 9, wherein the stream data processor analyzes stream data with a time range and also analyzes an analysis target with time information applied to each of the stream data, and the data generator executes a step of not generating stream data containing the column information not to be processed by the stream data processor on the basis of the query information, and wherein a time stamp is attached to each of the stream data and corresponds to a count unit of the stream data.

13. A stream data generating method according to claim 1, wherein the stream data processor includes a step of recording a quantity of stream data received from the data generator, and the data generator executes a step of judging whether or not to generate the less quantity of stream data according to the recorded quantity of received stream data.

14. A stream data generating method according to claim 13, wherein the data generator determines, in the step of judging whether or not to generate the less quantity of stream data, to generate the less quantity of stream data when the quantity of the stream data is larger than a predetermined quantity.

15. A computer system for generating stream data having time information applied thereto in a time series order and processing the generated stream data on the basis of a registered query, comprising:
a memory configured to store query inforamation including (1) column information indicating the columns to be analyzed as an analyzing target in the stream data, (2) range information indicating the range of data within the columns indicated in the column information to be analyzed as the analyzing target, and (3) condition information indicating a condition under which the analyzing target indicated in the range information is to be analyzed;
one of more computers configured with:
a data generator to generate and transmit a lesser quantity of stream data from the stream data on the basis of said query information; and
a stream data processor to perform analysis processing of said generated and transmitted stream data.

16. A non-transitory computer readable medium in a computer system for generating stream data having time information applied thereto in a time series order and processing the generated stream data on the basis of a registered query, said non-transitory computer readable medium stores therein a program, said program, causing, when executed, implementation of functions of:
storing therein query information including (1) column information indicating the columns to be analyzed as an analyzing target in the stream data, (2) range information indicating the range of data within the columns indicated in the column information to be analyzed as the analyzing target, and (3) condition information indicating a condition under which the analyzing target indicated in the range information is to be analyzed;
generating and transmitting a lesser quantity of stream data from the stream data on the basis of said query information; and
analysis processing said generated and transmitted stream data.

17. A stream data generating method according to claim 10, wherein the data generator executes a step of including no-operation data to replace a portion of the less quantity of stream data that is not to be analyzed by the stream data processor and transmitting the no-operation data to the stream data processor, where the no-operation data is not treated by the stream data processor as an analysis target.

18. A stream data generating method according to claim 1, wherein said storage further storing buffer status information including quantities of residual stream for different data streams processed in the stream data processor,
said data generator further executes a step of judging whether one quantity of residual stream is smaller than others by comparing each of said quantities in the buffer status information; and
said data generator executes a step of generating a lesser quantity of stream data having smaller quantity of residual stream according to the judging, from the stream data transmitted to the stream data processor on the basis of the query information.

19. A stream data generating method according to claim 15, wherein said storage further storing buffer status information including quantities of residual stream for different data streams processed in the stream data processor, said data generator further executes a step of judging whether one quantity of residual stream is smaller than others by comparing each of said quantities in the buffer status information; and said data generator executes a step of generating a lesser quantity of stream data having smaller quantity of residual stream according to the judging, from the stream data transmitted to the stream data processor on the basis of the query information.

20. A non-transitory computer readable medium according to claim 16, wherein said storage further storing buffer status information including quantities of residual stream for different data streams processed in the stream data processor, said data generator further executes a step of judging whether one quantity of residual stream is smaller than others by comparing each of said quantities in the buffer status information; and said data generator executes a step of generating a lesser quantity of stream data having smaller quantity of residual stream according to the judging, from the stream data transmitted to the stream data processor on the basis of the query information.

\* \* \* \* \*